United States Patent
Kloeden et al.

(10) Patent No.: US 9,882,799 B2
(45) Date of Patent: Jan. 30, 2018

(54) ASSIGNING TIME STAMPS TO RECEIVED DATA PACKETS

(71) Applicant: Bayerische Motoren Werke Aktiengesellschaft, Munich (DE)

(72) Inventors: Horst Kloeden, Munich (DE); Felix Klanner, Singapore (SG); Armin Bartsch, Munich (DE); Andreas Rauch, Kammerberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 249 days.

(21) Appl. No.: 14/736,528

(22) Filed: Jun. 11, 2015

(65) Prior Publication Data

US 2015/0281038 A1  Oct. 1, 2015

Related U.S. Application Data (63) Continuation of application No. PCT/EP2013/075554, filed on Dec. 4, 2013.

(30) Foreign Application Priority Data

Dec. 12, 2012 (DE) .......... 10 2012 222 885

(51) Int. Cl.
   *H04L 12/26* (2006.01)
   *H04J 3/06* (2006.01)

(52) U.S. Cl.
   CPC .......... *H04L 43/106* (2013.01); *H04J 3/0658* (2013.01); *H04L 43/067* (2013.01)

(58) Field of Classification Search
   CPC ..... H04J 3/0658; H04L 43/067; H04L 43/106
   (Continued)

(56) References Cited

U.S. PATENT DOCUMENTS 5,640,388 A * 6/1997 Woodhead ............ H04J 3/0673
                                                         348/464
7,937,232 B1   5/2011 Chow et al.
(Continued)

FOREIGN PATENT DOCUMENTS

DE   201 21 466 U1   4/2003
EP   0 394 051 A2   10/1990

OTHER PUBLICATIONS

Nilsson, John-Olof. "Time Synchronization and Temporal Ordering of Asynchronous Sensor Measurements of a Multi-sensor Navigator System." IEEE 2010.*

(Continued)

*Primary Examiner* — Stephen J Clawson
(74) *Attorney, Agent, or Firm* — Crowell & Moring LLP (57) ABSTRACT

A method is provided for assigning a time stamp to a specific data packet which, as with a group of received data packets, is received by a cyclically operating sensor. The specific data packet especially is part of the group of received data packets. The method includes: determining the time of arrival of each data packet of the group of received data packets; assigning a time stamp to each data packet of the group of data packets based on a first reference point in time; determining the time difference between the determined time of arrival and the assigned time stamp for each data packet of the group of data packets to provide a group of time differences; determining negative time differences from among the group of time differences, for the data packets of which it has been determined that the time of arrival preceded the respective assigned time stamp; determining the negative time differences that are not to be classified as outliers; determining a second reference point in time taking into account the negative time differences that are not to be classified as outliers; and assigning a time stamp to the (Continued)

specific data packet based on the second reference point in time.

19 Claims, 5 Drawing Sheets

(58) Field of Classification Search
USPC ......................................................... 370/252
See application file for complete search history.

(56) References Cited

U.S. PATENT DOCUMENTS

| | | | |
|---|---|---|---|
| 2001/0014093 A1* | 8/2001 | Yoda | H04L 12/2602 370/389 |
| 2005/0265334 A1* | 12/2005 | Koguchi | H04L 43/106 370/389 |
| 2006/0146815 A1* | 7/2006 | Tse | H04L 7/0331 370/389 |
| 2008/0027961 A1* | 1/2008 | Arlitt | G06F 11/3452 |
| 2009/0225787 A1 | 9/2009 | Andre | |
| 2014/0108441 A1* | 4/2014 | Samari | G06F 17/30551 707/758 |
| 2015/0295669 A1* | 10/2015 | Chapman | H04L 5/0007 370/503 |
| 2015/0304060 A1* | 10/2015 | Xiao | H04J 3/065 370/503 |

OTHER PUBLICATIONS

International Search Report (PCT/ISA/210) dated Feb. 17, 2014, with English translation (Seven (7) pages).
German Search Report dated Feb. 28, 2013, with English translation (Ten (10) pages).
Mair et al. "Spatio-Temporal Initialization for IMU to Camera Registration", Robotics and Biomimetics, IEEE International Conference, IEEE, Dec. 7, 2011, pp. 557-564, XP032165843 (Eight (8) pages).
Huck et al. "Precise Timestamping and Temporal Synchronization in Multi-Sensor Fusion", 2011 IEEE Intelligent Vehicles Symposium (IV), Baden-Baden, Germany, Jun. 5-9, 2011, pp. 242-247, XP031998982 (Six (6) pages).

* cited by examiner

ASSIGNING TIME STAMPS TO RECEIVED DATA PACKETS

CROSS REFERENCE TO RELATED APPLICATIONS

This application is a continuation of PCT International Application No. PCT/EP2013/075554, filed Dec. 4, 2013, which claims priority under 35 U.S.C. § 119 from German Patent Application No. 10 2012 222 885.3, filed Dec. 12, 2012, the entire disclosures of which are herein expressly incorporated by reference.

This application contains subject matter related to U.S. application Ser. No. 14/736,560, entitled "Assigning Time Stamps to Received Data Packets" filed on Jun. 11, 2015.

BACKGROUND AND SUMMARY OF THE INVENTION

The invention relates to a method for assigning a time stamp to a specific received data packet, a corresponding device and a corresponding computer program.

Modern vehicles are often equipped with driver assistance systems which provide many functions such as emergency braking or the identification of lane markers. Likewise, there are considerations to allow environmental models to be calculated by central processing units in vehicles, which models can, in turn, be used as output data for driver assistance systems. For this purpose, sensors are provided in vehicles, which sensors measure the properties of the environment of the vehicle or the properties of the vehicle itself. The measured data of the sensors is usually transferred from the sensors to the processing unit or units via a bus, such as a CAN bus.

Since, as a rule, the environment of a vehicle changes during use because the vehicle or other road users move(s), the instant at which the measured data was detected by the sensor is important in the processing of the measured data. The sensor measurement then relates in particular to the environment as it was at a determined instant. The sensor measurement has only limited significance, if any, for another instant.

For this reason, it is generally desirable to also specify the time at which a measurement was performed with said measurement of a sensor. Information of this type is referred to as a time stamp. In this case, it is essential that the instant of the measurement can be reliably determined by the processing unit in its own time logs since the measured data is processed on this basis and since this can often only be set with reference to the real environment of the vehicle. This requirement is particularly relevant in the case of linking or fusion of data of a plurality of sensors. Without temporal classification of the data of a plurality of sensors with respect to one another. The data cannot be processed in a meaningful way.

However, sensors are often not set up also to output, in addition to the output measured data, a time stamp or information having this purpose by means of which the processing unit could reliably determine the instant of the measurement. Even if a sensor has a time log which is generally suitable for generating a time stamp, this is often not synchronized with the time log of the processing unit which is essential for processing and is often susceptible to errors such as drift. As a result, therefore, no usable time stamp can be provided by most sensors for the measured data thereof.

Nevertheless, an obvious solution to providing time stamps for the sensor data entering the processing unit is to assign the respective sensor data items the arrival time thereof at the processing unit as time stamp. However, this method does not only present the disadvantage that the assigned time stamp indicates an instant which is generally delayed with respect to the instant of the actual measurement, but also that the delay is not constant in practice. This is based on the fact that the transit time of a data packet from the sensor to the processing unit is subject to various random influences, such as utilization of the transfer buses which are also used by other independent users, scheduling of the processing unit or of intermediately connected buffers or other comparable influences. The transfer time is therefore subject to fluctuations, also referred to as jitter. Depending on the purpose of the sensor data, the frequency of the measurements of the sensor or to what extent the use is time-critical, the jitter may lead to the received sensor data being usable only to a limited extent or even not at all on the basis of a time stamp determined in this way.

Proceeding from the above-described solution, methods are proposed in the prior art with which time stamps can be determined in an improved manner for sensors which perform measurements and output sensor data in an at least approximately cyclic fashion. Owing to the frequent use of such sensors, said methods are widely applicable.

In the publication "Precise Timestamping and Temporal Synchronization in Multi-Sensor Fusion", Tobias Huck et al., Intelligent Vehicles Symposium (IV), 2011, IEEE, pages 242 to 247, such a method is presented in detail. According to that document, the cyclicity of the sensor measurements is used in order to infer or estimate the cycle time of the sensor by observing several cycles (using the arrival times of received data packets). In fact, a Kalman filter is used for this purpose. The time stamp which is then assigned to a data packet is determined as follows: proceeding from the arrival time of the data packet which has the shortest transit time determined by the processing unit (the so-called reference instant), a time stamp is assigned to a data packet following said data packet on the basis of a multiple of the estimated cycle time. In this way, the best available approximation of the actual measurement instant of the sensor (in particular the arrival time of the packet with the shortest transit time) benefits all subsequent data packets. The assigned time stamps are also free of fluctuations of the size of a jitter.

Figure 1:
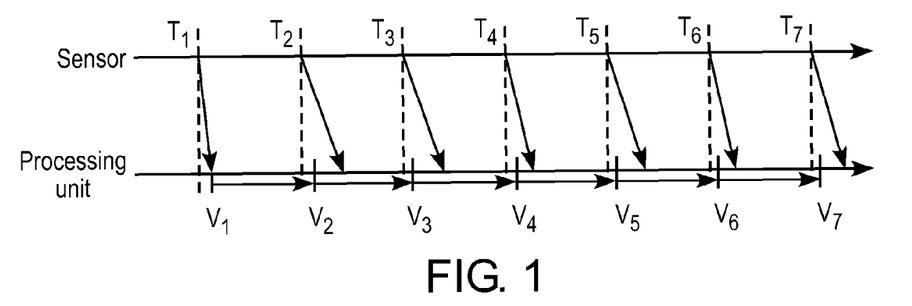
FIG. 1 shows the scheme for assigning a time stamp to received data packets.

Further explanations relating hereto are given in the section "Algorithm II" of said publication. FIG. 1 also reproduces the principle schematically. The sensor performs measurements which ideally follow the cycle illustrated by T1, T2, etc. and transmits data packets on the basis of the measurements to the processing unit. The data packets undergo a delay (illustrated by the arrows pointing downward) and reach the processing unit at an arrival instant. The data packet with the shortest transit time in this case is the data packet which was sent at T1. The arrival time of the data packet forms the reference instant (in other words: the reference instant is set). For this data packet, the arrival time is the same as the time stamp, in this case V1. The time stamps V1, V2, V3, etc. are assigned on the basis of the reference instant. In this case, the estimated cycle time (illustrated by the horizontal arrows) is added to each subsequent data packet after V1. In this example, it should be assumed that the cycle time is estimated accurately. As can be readily seen, the assigned time stamps V2, V3, etc. are always earlier than the actual arrival time of the data packets and hence better estimations for the actual measurement instant of the sensor.

However, the method disclosed in the above-mentioned publication fails to take into account a phenomenon which can lead to imprecisely assigned time stamps. This relates to the case in which the sensor, owing to temporary external influences, performs a single measurement (or a group of measurements) earlier in comparison with its cycle. Therefore, an "outlier" occurs for the sensor. A problem then exists when the sensor performs a measurement at such an earlier instant that the arrival time of the data packet resulting from the measurement is before the instant at which measurements take place in its normal cycle and if the sensor then returns to the original cycle. In such a case, the assigned time stamps for all subsequent measurements are before the actual measurement instant and are therefore erroneous.

Figure 2:
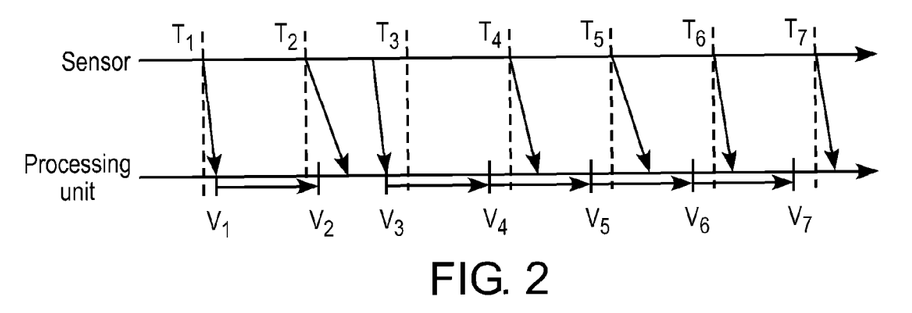
FIG. 2 schematically shows an occurrence of error in determining a time stamp according to the scheme explained with reference to FIG. 1.

FIG. 2 schematically illustrates this phenomenon, building upon the diagram of FIG. 1 under the assumption of an accurate estimation of the cycle time. The measurement of the sensor which was actually to be performed at the instant V3 is performed prematurely. The data packet based thereon reaches the processing unit before the instant V3 and at the same time as the data packet with the shortest transit time according to the algorithm of the publication mentioned above. The arrival time of this data packet (V3) consequently becomes the new reference instant of the method (in other words: the reference instant is newly set). The assigned time stamps for this data packet and for future data packets are calculated on the basis of this reference instant. As can be seen, the assigned time stamps V3, V4, V5, etc. are too early in comparison with the actual measurement instants and even their absolute error in comparison with the actual measurement instants is greater than before for V1 and V2. According to the algorithm of the above-mentioned publication, the reference instant is therefore set too earlier owing to an outlier.

The problem for the person skilled in the art is robust determination of the reference instant for time stamps of incoming data packets.

The problem is solved by a method, a device, a vehicle, and a computer program in accordance with embodiments of the invention. Advantageous developments are defined in the dependent claims.

In one aspect, a method for assigning a time stamp to a specific data packet which, as with a group of received data packets, is received by a cyclically operating sensor, wherein the specific data packet is in particular part of the group of received data packets, comprises: determining the arrival time for each data packet of the group of received data packets; assigning a time stamp to each data packet of the group of data packets on the basis of a first reference instant; determining the time difference between the determined arrival time and the assigned time stamp for each data packet of the group of data packets (group of time differences); determining the time differences from the group of time differences, for the data packets for which it has been determined that the arrival time preceded the respective assigned time stamp (negative time differences); determining the negative time differences which are not to be classified as outliers; determining a second reference instant taking into account the negative time differences which are not to be classified as outliers; and assigning a time stamp to the specific data packet on the basis of the second reference instant. The determination of the negative time differences which are not to be classified as outliers comprises checking, for each negative time difference, whether it is not an outlier. The method does not exclude the second reference instant from also being determined taking into account the negative time differences which, although they are not clearly to be classified as outliers, are also not clearly not to be classified as outliers. The time differences which represent the boundary cases can therefore be taken into account.

The arrival time of a plurality of data packets is taken into account via the second reference instant when assigning the time stamp to the specific data packet. In the previously known methods, it was always only a single arrival time which was taken into account as the reference instant for the determination of the time stamp, in particular the earliest arrival time up to then with reference to the cycle of the sensor. However, when the earliest arrival time is not representative of the actual measurement instants because it is an outlier, an error occurs. According to the method proposed here, the second reference instant is set on the basis of consideration of a group of data packets. This enables the identification of outliers and the avoidance of a reference instant which is set too early.

If an otherwise cyclical, stably operating sensor performs a measurement prematurely owing to external influences and thus generates an outlier, the outlier propagates. The arrival time is then an outlier compared to the arrival times of other data packets and the same applies to the time difference assigned to said data packet.

In a typical implementation, the time differences are determined as the difference between the assigned time stamp and the determined arrival time, wherein the time stamp is subtracted from the arrival time. The time differences, referred to herein as negative time differences, therefore have typical numerical values of less than zero.

The group of data packets typically comprises a relatively large number of data packets, for example 10, 100 or 1000 data packets. A group of data packets does not necessarily have to contain all directly successively received data packets but instead can also comprise only every second, third or any other selected data packet of the successively received data packets. The shortest time difference can relate to the magnitude of the time difference. The negative time differences which are not to be classified as outliers can comprise all negative time differences if no negative time difference is to be classified as an outlier.

Provision can be made for all steps of the method up until the last three steps (determining the negative time differences, determining the second reference instant, assigning a time stamp to the specific data packet) to be performed in individual steps for each (or each second, third or any other selected) received data packet, which is in each case a subset of the steps of the method (up until the last three steps). In particular, therefore, each data packet is assigned a time stamp when it is received at the processing unit.

If no negative time differences can be determined (for example because all assigned time stamps are later than the determined arrival times), provision can be made for all steps of the method building on the negative time differences to not be performed. Said steps would be determining the negative time differences which are not to be classified as outliers; determining a second reference instant taking into account the negative time differences which are not to be classified as outliers; and assigning a time stamp to the specific data packet on the basis of the second reference instant. Optionally, instead of these, provision can be made for a time stamp for the specific data packet to be determined on the basis of the first reference instant.

If no negative time differences which are not to be classified as outliers can be determined (for example because all negative time differences are classified as outliers), provision can be made for all of the steps building thereon to not be performed. Said steps would be determining a second reference instant taking into account the negative time differences which are not to be classified as outliers; and assigning a time stamp to the specific data packet on the basis of the second reference instant. Optionally, instead of these, provision can be made for a time stamp for the specific data packet to be determined on the basis of the first reference instant.

Furthermore, provision can be made for the method to be performed for a new group of data packets. The second reference instant is then used to determine time stamps for the new group of data packets.

In an advantageous development, provision can be made for an adapted time stamp to be determined for the specific data packet. For the adapted time stamp, a minimum processing time is subtracted from the time stamp. The minimum processing time corresponds to the time which a data packet requires at minimum for transmission from the sensor to the processing unit. In this way, the actual measurement instant of the sensor can be estimated in an even better manner. Even when using an adapted time stamp, there is often the danger that a premature measurement of a sensor owing to an outlier (according to the problem illustrated above with reference to FIG. 2) leads to an adapted time stamp that is before the actual measurement instant of the sensor. In particular, when using the adapted time stamp, it is therefore important to avoid setting a reference instant which is too early and hence time stamps which are too early (on the basis of the actual cyclical measurement instants of the sensors).

In a development, the determination of the negative time differences which are not to be classified as outliers comprises the following steps: determining a threshold value on the basis of the determined negative time differences; and determining the negative time differences which lie within the threshold value, in particular the negative time differences of which the magnitude is smaller than the magnitude of the threshold value. The outliers among the negative time differences are therefore identified by the comparison with a threshold value. Time differences which lie within the threshold value are correspondingly not considered to be outliers. The threshold value itself is determined taking into account the negative time differences.

The threshold value can in this case be determined on the basis of one of the following conditions: the variance of the negative time differences; the variance of the negative time differences which lie in a quantile of the time differences, in particular in the 90th or 95th percentile; the variance of the negative time differences of which the magnitude is smaller than a maximum value. Building on the variance, a multiple (in particular also an odd-numbered multiple) of the square root of the variance (that is to say of the standard deviation) can then be the threshold value. Provision can be made for the maximum value based on the basis of how often and to what extent the reference instant in preceding assignments of time stamps had to be corrected to earlier or later times. A method for assigning a later time to a reference instant is disclosed in U.S. application Ser. No. 14/736,560, entitled "Assigning Time Stamps to Received Data Packets" filed on Jun. 11, 2015. Methods for determining the variance of a plurality of values are well known from the prior art.

Instead of using the variance to determine the threshold value, it is also possible for clusters of the negative time differences to be formed. Building on this, the threshold value can then be determined on the basis of the boundary between two clusters. Methods for forming clusters of negative time differences are known from the prior art. A threshold value determined in this way can also be referred to as dynamic gating.

In a development, the determination of the second reference instant taking into account the negative time differences which are not to be classified as outliers comprises the following steps: selecting a single time difference from the negative time differences which are not to be classified as outliers; and setting the second reference instant to the arrival time of the data packet for which the arrival time of the selected single time difference has been determined. The second reference instant is therefore determined on the basis of the arrival time of a data packet. The data packet is in this case determined on the basis of the assigned time difference, wherein only data packets whose time differences are negative time differences are considered here. In detail, the following criteria can be used to select the individual time difference: the negative time difference of which the magnitude is greater than the magnitudes of the remaining negative time differences which are not to be classified as outliers; or the negative time difference which forms the boundary element of a quantile of the negative time differences which are not to be classified as outliers, in particular of the 90th percentile. The boundary element is the final element which is still included in the quantile, or the first which is just no longer included.

Alternatively, the determination of the second reference instant taking into account the negative time differences which are not to be classified as outliers comprises the following steps: determining a descriptive value, in particular a statistical measure for the negative time differences or a subgroup of the negative time differences which are not to be classified as outliers; and setting the second reference instant to the descriptive value. In detail, the descriptive value can be the following: the average of the negative time differences, or a subgroup thereof, which are not to be classified as outliers, in particular the geometric or arithmetic average; or the median of the negative time differences, or a subgroup thereof, which are not to be classified as outliers. The subgroup of the negative time differences can be defined such that it consists of all of the negative time differences which are in a quantile and are not to be classified as outliers.

In another development, the determination of the second reference instant comprises the following steps: setting the second reference instant to: the arrival time of the data packet of which the determined negative time difference is not to be classified as an outlier and of which the magnitude of the negative time difference is greater than the magnitudes of the rest of the negative time differences. Therefore, the earliest arrival time of the time differences which are not to be classified as outliers is used as a new (second) reference instant. Alternatively, the second reference instant can also be set to the average, in particular the weighted average, of the negative time differences which are not to be classified as outliers; or to the boundary value of a quantile of the negative time differences which are not to be classified as outliers, in particular of the 90th percentile. In the two latter cases, the second reference instant is not set to a determined arrival time of a data packet but is calculated. Of course, it may result here in said calculated time and the arrival time of a data packet coinciding.

The group can comprise a minimum number of data packets, wherein the specific data packet can be included in the group of data packets or can be received later as the last received data packet of the group.

In a development, the determination of a second reference instant takes into account one or more of the following criteria: the total number of data packets received by the sensor since the start-up of a system performing the method; the transit time since the start-up of a system performing the method; the number of determinations of a reference instant since the start-up of a system performing the method; and the size of the magnitudes or a statistical measure of the size of the magnitudes of all determined negative time differences since the first of a system performing the method. The method is generally performed by an electronic system which can be one of the devices described below. This performs one of the above-mentioned methods as soon as it is started up, that is to say started. After starting, new reference instants are gradually determined and arrival times are determined for temporally successive data packets. The method is therefore performed continually. The insights obtained during the continual performance are taken into account in this development when determining the second reference instant. If the system has already been running for a long time and a large number of data packets are therefore present, it can be assumed that the reference instant has "settled". Changes to this should then only be performed in small magnitudes. This can be achieved, for example, by an additional factor (<1) by which the negative time differences which are not to be classified as outliers are multiplied before the second reference instant is determined. Another criterion takes into account whether it is apparent that the sensor and the packet transmission are working in a stable manner, that is to say few or no outliers are produced. In this case, slight changes, that is to say relatively large magnitudes of the negative time differences than previously determined, can be reacted to more precisely or more quickly. If, in contrast, the arrival times of the data packets have often been widely spread and irregular since the start-up, the adaption of the time stamps must take place more cautiously, that is to say only after repeated confirmation of early arrival times.

In another aspect, a device comprises an electronic calculation unit (also referred to as processing unit herein) which is set up to perform a method according to one of the methods set out above. The electronic calculation unit can be a microcontroller, a computer or dedicated circuits, optionally with the required interfaces. The calculation unit can be set up using software. In another aspect, a motor vehicle comprises such a device.

In another aspect, a computer program comprises program code instructions for performing one of the methods set out above. The instructions of the computer program can prompt a computer to perform the steps of one of the methods set out above.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference signs or symbols relate to corresponding elements throughout the figures.

DETAILED DESCRIPTION OF THE DRAWINGS

Figure 3:
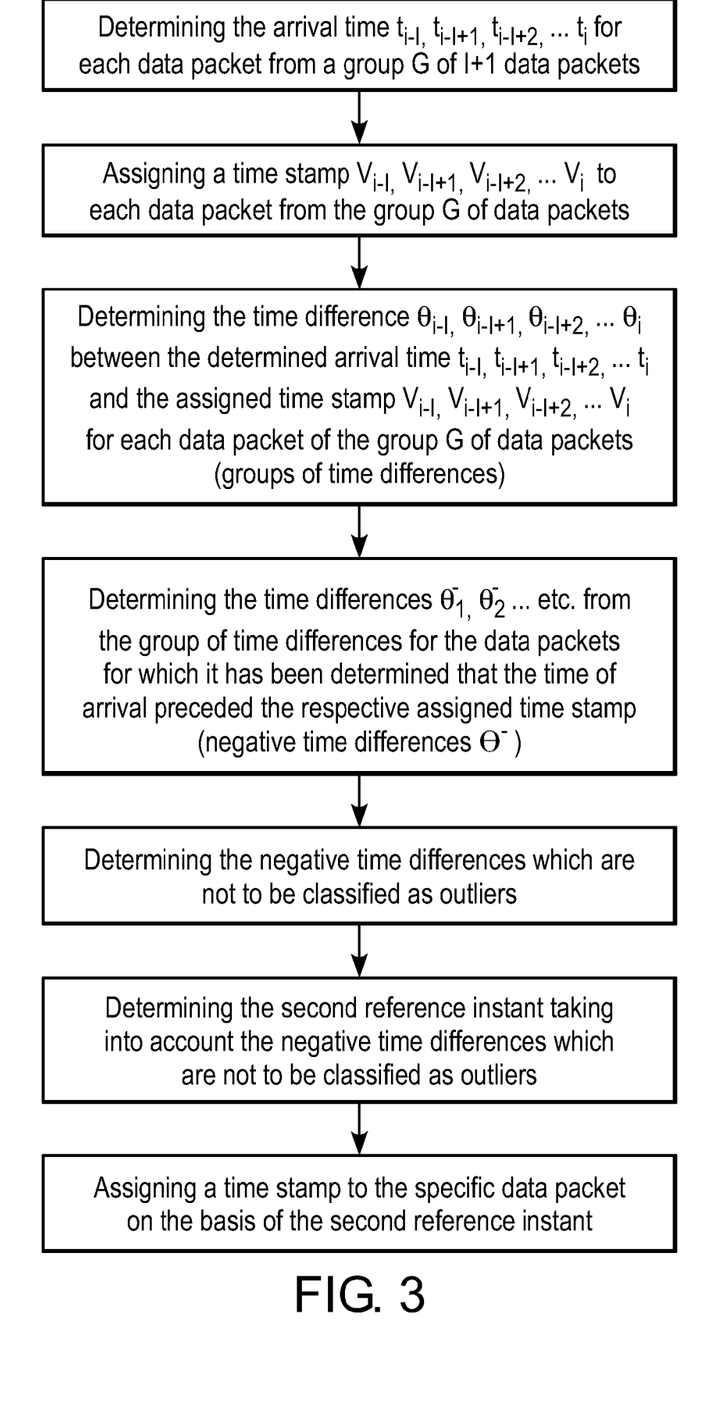
FIG. 3 is a flow chart for carrying out the invention according to an exemplary embodiment.

FIG. 3 is a flow chart for carrying out the invention according to an exemplary embodiment for assigning a time stamp to the specific data packet. The specific data packet may be part of a group G of data packets. In this case, it should be assumed that the last-received data packet i is part of the group G. It is also contemplated, however, that the data packet i is not part of the group G and, for example, is received after the last-received data packet of the group G. Firstly, the arrival time $t_{i-I}, t_{i-I+1}, t_{i-I+2}, \ldots t_i$, is determined for each data packet from a group G of I+1 data packets. The time stamps $V_{i-I}, V_{i-I+1}, V_{i-I+2}, \ldots V_i$ are assigned to said data packets and the time differences $\theta_{i-I}, \theta_{i-I+1}, \theta_{i-I+2}, \ldots \theta_i$, between the determined arrival time $t_{i-I}, t_{i-I+1}, t_{i-I+2}, \ldots t_i$ and the assigned time stamp $V_{i-I}, V_{i-I+1}, V_{i-I+2}, \ldots V_i$ are determined for each data packet of the group G. The time differences are referred to in the following text by the term "group of time differences". Subsequently, the time differences $\theta_{-1}, \theta_{-2}$, etc. are determined from the group of time differences for the data packets for which it has been determined that the arrival time preceded the respective assigned time stamp, which are referred to herein as negative time differences $\theta-$. Now, from the negative time differences $\theta-$, the time differences which are not to be classified as outliers are determined. Building on the determined time differences in turn, a second reference instant is determined, on the basis of which a time stamp $V_i$ is again assigned to the specific data packet. This second reference instant can also be used to assign time stamps of further received data packets $V_{i+1}, V_{i+2}$, etc.

Figure 4:
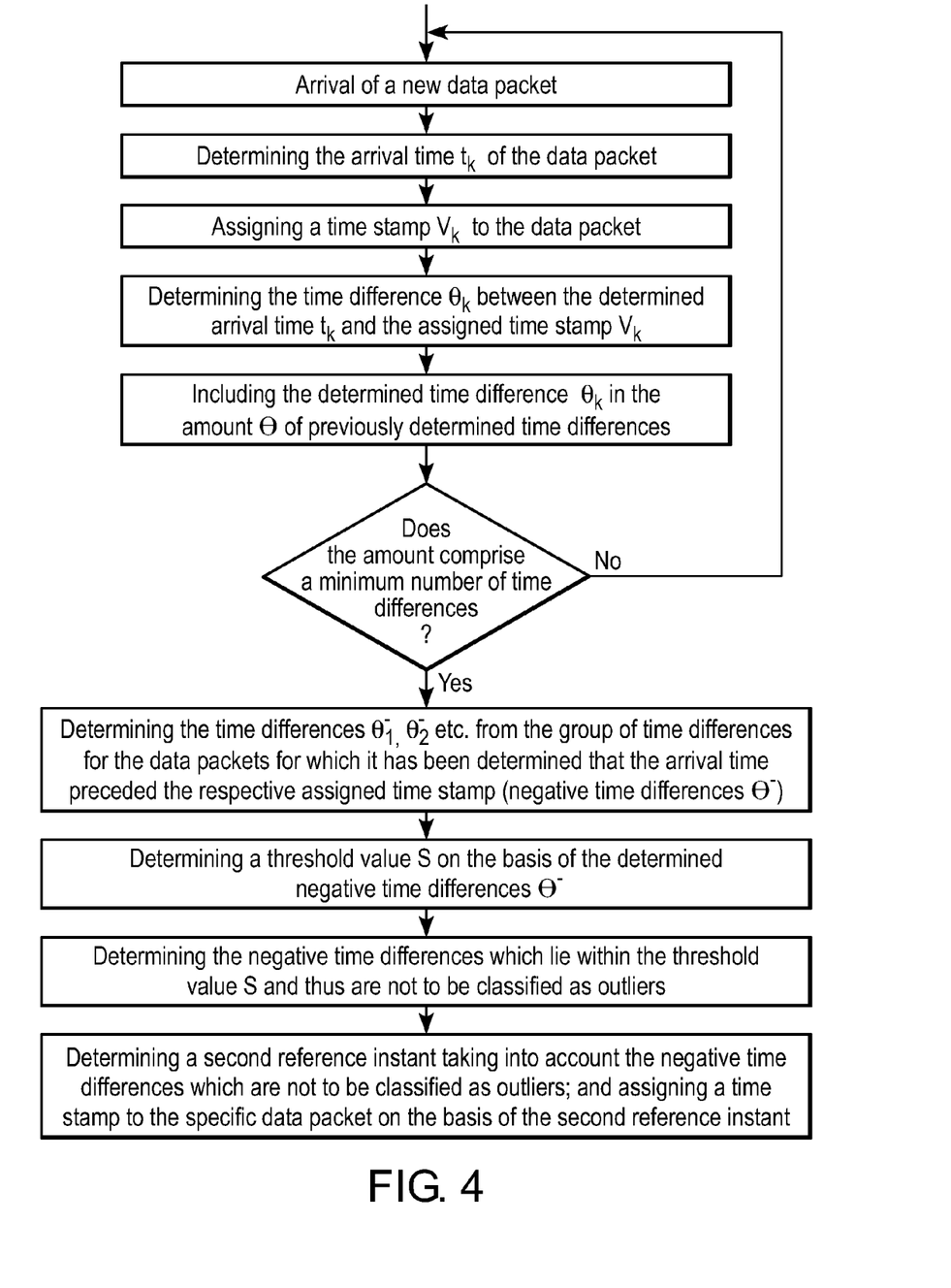
FIG. 4 is a flow chart for carrying out the invention according to an exemplary embodiment.

FIG. 4 is a flow chart for carrying out the invention according to an exemplary embodiment. In this example, the steps up until the last three are performed individually for each received data packet. If the steps individually performed for each data packet are performed for all of the data packets of the group, this means that the arrival times for each data packet of the group are determined and the time stamps for each data packet of the group are assigned.

After a new data packet has arrived, the arrival time $t_k$ is determined for each received data packet k and a time stamp $V_k$ is assigned to said arrival time and the time difference $\theta_k$ is determined and included in an amount $\theta$. Provided the amount comprises a minimum number of elements, often a relatively large number, the negative time differences $\theta-$ are determined. In a typical implementation, this can be done by all of the time differences which are less than zero being selected.

Building on the time differences $\theta-$, a threshold value S is then determined. For this purpose, the calculation of the variance of the negative time differences $var(\theta-)$ can be provided as preceding step. The threshold value S itself is then determined as odd-numbered multiple g of the standard deviation: $S = g * \sqrt{var(\theta-)}$. By way of example, "g" can assume values of 2; 2.3; 3; 3.1 and can be determined by testing or on the basis of probability distributions of the negative time differences.

Subsequently, the negative time differences which are within the threshold value S are determined, the magnitude of which negative time differences is therefore lower than the threshold value S. For this, $|\theta-k|<S$ applies. These negative time differences are then those which are not to be classified as outliers. In general, it is contemplated not only to classify the negative time differences according to outliers and non-outliers, but also to provide further categories, for example for boundary cases. Time differences which are classified, for example, as boundary cases can likewise be used in the rest of the method for determining the second reference instant.

When determining the threshold value S, variants can also be used. Thus, provision can be made not to use all negative time differences for determining variance but rather to limit oneself to those of which the magnitude is smaller than a maximum value. Provision can also be made to take into account only negative time differences of which the magnitude is smaller than that of the negative time difference which marks a particular quantile, for example the 95th percentile. Another use for determining the threshold value S can be the formation of clusters of the negative threshold values. Building on the boundary between clusters, the threshold value can then be determined.

Alternatively, building on the formed clusters, a determined cluster or a plurality of clusters can itself be defined as outlier. The remaining clusters then contain negative time differences which are not to be classified as outliers.

Finally, the second reference instant is determined taking into account the negative time differences which are not to be classified as outliers. For this purpose, in particular, the negative time difference which is not to be classified as an outlier and which has the largest magnitude can be determined. The arrival time of the associated data packet is then used as the second reference instant. Furthermore, methods are also contemplated which set the second reference instant not directly at an arrival instant but, from a plurality of negative time differences which are not to be classified as outliers, calculate an instant which is then used as second reference instant. By way of example, an average can be calculated, possibly a weighted average, or the boundary of a quantile of the negative time differences which are not classified as outliers can be used as second reference instant.

Subsequently, a time stamp is assigned to the specific data packet on the basis of the second reference instant.

Figure 5:
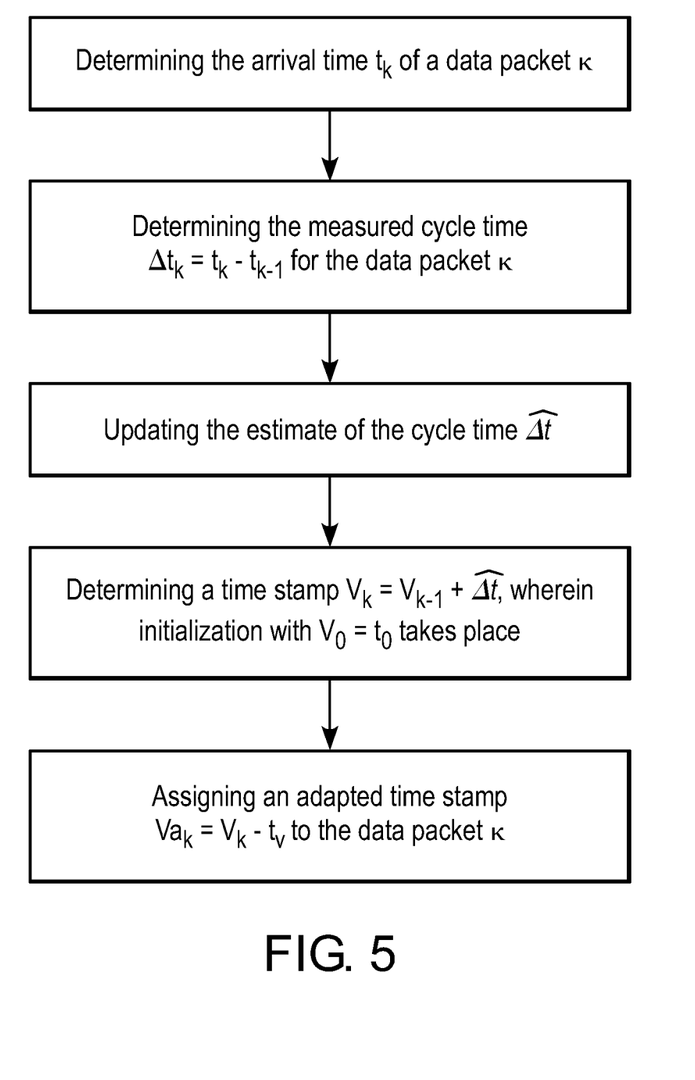
FIG. 5 is a flow chart for assigning an adapted time stamp, as can be used in an exemplary embodiment.

FIG. 5 is a flow chart for assigning a time stamp and an adapted time stamp, as can be used in an exemplary embodiment and hence can be part of an exemplary embodiment. In the sequence illustrated here, individual arrival times are determined for the received data packets of the group of data packets and time stamps and adapted time stamps are assigned. Once the steps have been performed for each data packet of the group of data packets, the arrival times are determined for each data packet of the group and the time stamps and adapted time stamps are assigned.

Hence, it begins with determining the arrival time $t_k$ of a data packet k. Subsequently, the measured cycle time $\Delta t_k = t_k - t_{k-1}$ for the data packet k is determined. Building on this, the estimation of the cycle time is $\widehat{\Delta t}$ updated. The estimation of the cycle time can be performed as a running average, as illustrated, for example, with reference to FIG. 6. Then, the cycle time is used in order to determine a time stamp $V_k$ for the data packet according to the formula $V_k = V_{k-1} + \widehat{\Delta t}$ which is initialized with $V_0 = t_0$. The adapted time stamp $Va_k = V_k - t_v$ is then assigned to the data packet.

In this example, the time stamp $V_k$ is different from the adapted time stamp $Va_k$ in that another processing time $t_v$ is subtracted from the time stamp $V_k$. This procedure is based on the model that, proceeding from the actual measurement instant of the sensor, delays the arrival time of the data packet with the sensor information by a minimum processing time $t_v$ which cannot be undershot. The time at which the data packet then actually arrives at the processing unit is additionally a determined arbitrary time longer, the so-called jitter. The jitter is a random time delay greater than zero. By taking into account the processing time $t_v$, the adapted time stamp can estimate the actual measurement instant of the sensor in an improved manner. The processing time $t_v$ can be determined using methods known from the prior art, such as a transit-time measurement under ideal conditions or a series of tests. The adoption of the model for the determined arrival time $t_k$ is therefore the actual instant of the sensor measurement which belongs to the data packet $k, +t_v+j_k$, wherein $j_k$ describes the jitter for the data packet k. In other words, the adoption of the model for the determined arrival time is that the data packet arrives later than the actual instant of the sensor measurement by the processing time and the jitter.

Figure 6:
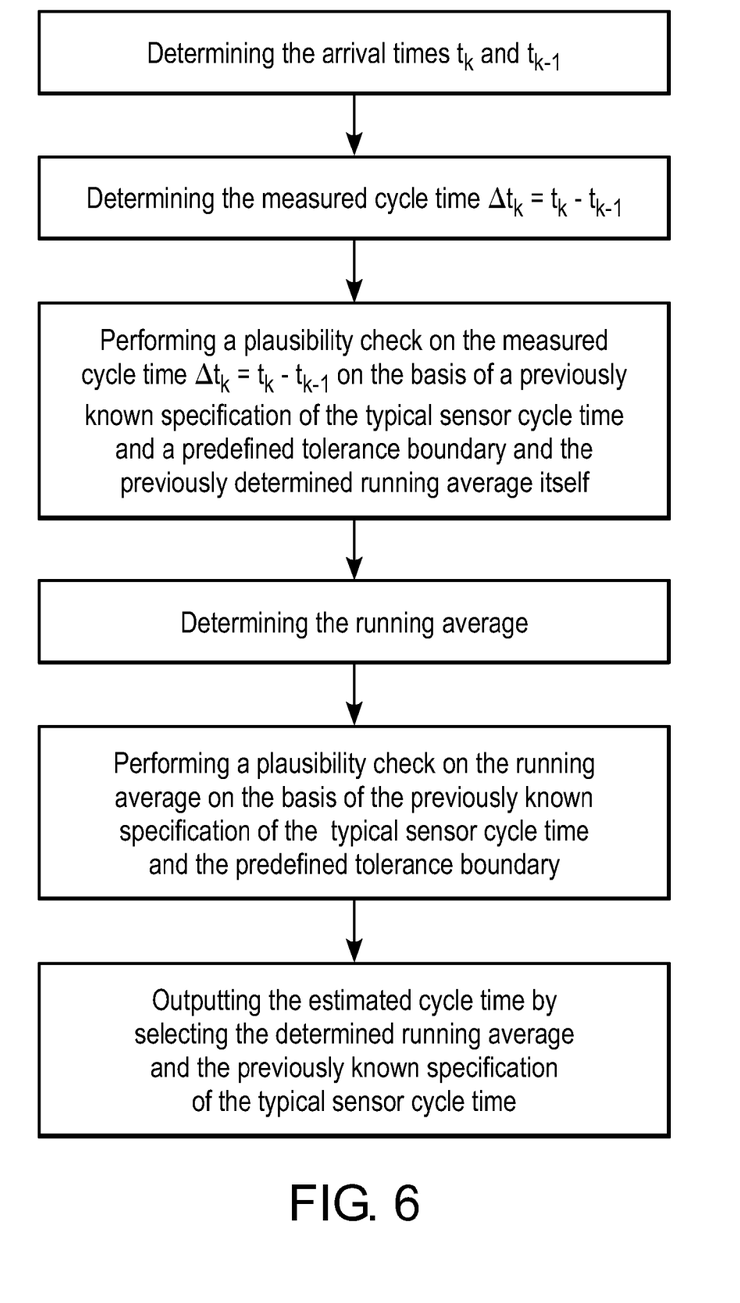
FIG. 6 is a flow chart for estimating the cycle time, as can be used in an exemplary embodiment.

FIG. 6 is a flow chart for estimating the cycle time, as can be used in an exemplary embodiment and hence can be part of an exemplary embodiment. Firstly, the arrival times $t_k$ and $t_{k-1}$ of two successive data packets k and k−1 are determined, optionally by measurement, the difference between which arrival times is the measured cycle time $\Delta t_k = t_k - t_{k-1}$. A plausibility check is performed for this measured cycle time on the basis of a previously known specification of the typical sensor cycle time (for example, a stored specification from the sensor manufacturer) and a predefined tolerance boundary (for example, stored in a configuration file) and the previously determined running average itself. If the measured cycle time is found to be implausible, the previously determined specification or the preceding calculated average is output. If the measured cycle time is found to be plausible, the running average is determined. This can be calculated using the formula:

$$\widehat{\Delta t_k} = \left(1 - \frac{1}{n}\right)\widehat{\Delta t_{k-1}} + \frac{1}{n}\Delta t_k,$$

wherein n can be the smaller of a predefined value N and k (k is the absolute count of the received data packets). Subsequently, the plausibility of the running average is checked on the basis of the previously known specification of the typical sensor cycle time and the predetermined tolerance boundary. If the average is found to be implausible, the predetermined specification is output. If the average is found to be plausible, said average is output.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for assigning a time stamp to a specific data packet which, as with a group of received data packets, is received by a cyclically operating sensor, wherein the specific data packet is part of the group of received data packets, the method comprising the acts of:

determining an arrival time for each data packet of the group of received data packets;
assigning a time stamp to each data packet of the group of data packets based on a first reference instant;
determining a time difference between the determined arrival time and the assigned time stamp for each data packet of the group of data packets to provide a group of time differences;
determining negative time differences from the group of time differences for the data packets where the arrival time was determined to precede the respective assigned time stamp;
determining the negative time differences which are not to be classified as outliers;
determining a second reference instant taking into account the negative time differences which are not to be classified as outliers; and
assigning a time stamp to the specific data packet based on the second reference instant.

2. The method according to claim 1, wherein the act of determining the negative time differences which are not to be classified as outliers comprises the following acts of:
determining a threshold value on the basis of the determined negative time differences; and
determining the negative time differences of which the magnitude is smaller than a magnitude of the threshold value.

3. The method according to claim 2, wherein the threshold value is determined based on one of the following conditions:
a variance of the negative time differences;
a variance of the negative time differences which lie in a quantile of the time differences; and
a variance of the negative time differences of which the magnitude is smaller than a maximum value.

4. The method according to claim 3, wherein the threshold value is determined based on a multiple of a square root of the variances used to determine the threshold value.

5. The method according to claim 4, wherein the multiple is an odd-number.

6. The method according to claim 3, wherein the variances of the negative time differences which lie in the quantile of the time differences lie in a $90^{th}$ or $95^{th}$ percentile.

7. The method according to claim 2, wherein the act of determining the threshold value comprises the following acts of:
forming clusters of the negative time differences; and
determining the threshold value based on a boundary between two clusters.

8. The method according to claim 1, wherein the act of determining the negative time differences which are not to be classified as outliers comprises the following acts of:
forming clusters of the negative time differences; and
determining one or more of the clusters to be classified as outliers.

9. The method according to claim 1, wherein the act of determining the second reference instant taking into account the negative time differences which are not to be classified as outliers comprises the following acts of:
selecting a single time difference from the negative time differences which are not to be classified as outliers; and
setting the second reference instant to the arrival time of the data packet for which the arrival time of the selected single time difference has been determined.

10. The method according to claim 9, wherein the act of selecting the single time difference comprises the following acts of:
selecting the negative time difference of which a magnitude is greater than the magnitudes of the remaining negative time differences which are not to be classified as outliers; or
selecting the negative time difference which forms a boundary element of a quantile of the negative time differences which are not to be classified as outliers.

11. The method according to claim 10, wherein the boundary element of the quantile is a $90^{th}$ percentile.

12. The method according to claim 9, wherein the act of determining the second reference instant taking into account the negative time differences which are not to be classified as outliers further takes into account one or more of the following criteria:
a total number of data packets received by the sensor since the start-up of a system performing the method;
a transit time since the start-up of a system performing the method;
a number of determinations of a reference instant since the start-up of a system performing the method; and
a size of the magnitudes or a statistic measure of the size of the magnitudes of all determined negative time differences since the start-up of a system performing the method.

13. The method according to claim 1, wherein the act of determining the second reference instant taking into account the negative time differences which are not to be classified as outliers comprises the following acts of:
determining a descriptive value, for the negative time differences or a subgroup of the negative time differences which are not to be classified as outliers; and
setting the second reference instant to the descriptive value.

14. The method according to claim 13, wherein the descriptive value is a statistical measure.

15. The method according to claim 13, wherein the descriptive value is one of the following values:
an average of the negative time differences, or a subgroup thereof, which are not to be classified as outliers; or
a median of the negative time differences, or a subgroup thereof, which are not to be classified as outliers.

16. The method according to claim 15, wherein the subgroup of the negative time differences is a subgroup quantile of the negative time differences.

17. The method according to claim 1, wherein the group of data packets comprises a minimum number of data packets and/or wherein the specific data packet is included in the group of data packets or is received later as the last-received data packet of the group.

18. A motor vehicle, comprising:
an electronic controller including
a memory storing a program having program code segments; and
an associated processor for executing the program code segments to: determine an arrival time for each data packet of the group of received data packets;
assign a time stamp to each data packet of the group of data packets based on a first reference instant;
determine a time difference between the determined arrival time and the assigned time stamp for each data packet of the group of data packets to provide a group of time differences;

determine negative time differences from the group of time differences for the data packets where the arrival time was determined to precede the respective assigned time stamp;

determine the negative time differences which are not to be classified as outliers;

determine a second reference instant taking into account the negative time differences which are not to be classified as outliers; and assign a time stamp to the specific data packet based on the second reference instant.

19. A computer product, comprising a non-transitory computer readable medium having stored thereon program code segments that:

determine an arrival time for each data packet of the group of received data packets;

assign a time stamp to each data packet of the group of data packets based on a first reference instant;

determine a time difference between the determined arrival time and the assigned time stamp for each data packet of the group of data packets to provide a group of time differences;

determine negative time differences from the group of time differences for the data packets where the arrival time was determined to precede the respective assigned time stamp;

determine the negative time differences which are not to be classified as outliers;

determine a second reference instant taking into account the negative time differences which are not to be classified as outliers; and assign a time stamp to the specific data packet based on the second reference instant.

* * * * *